(12) United States Patent
Yoon et al.

(10) Patent No.: US 11,199,717 B2
(45) Date of Patent: Dec. 14, 2021

(54) HEAD MOUNTED DISPLAY

(71) Applicant: LG ELECTRONICS INC., Seoul (KR)

(72) Inventors: Sumin Yoon, Seoul (KR); Bupsung Jung, Seoul (KR); Hoon Hur, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/040,503

(22) PCT Filed: Apr. 3, 2018

(86) PCT No.: PCT/KR2018/003887
§ 371 (c)(1),
(2) Date: Sep. 22, 2020

(87) PCT Pub. No.: WO2019/182185
PCT Pub. Date: Sep. 26, 2019

(65) Prior Publication Data
US 2021/0026148 A1  Jan. 28, 2021

(30) Foreign Application Priority Data
Mar. 23, 2018 (KR) .......................... 10-2018-0034016

(51) Int. Cl.
*G02B 27/01* (2006.01)

(52) U.S. Cl.
CPC .... *G02B 27/0176* (2013.01); *G02B 2027/014* (2013.01); *G02B 2027/0138* (2013.01); *G02B 2027/0178* (2013.01)

(58) Field of Classification Search
CPC .......................... G02B 27/017; G02B 27/0176
See application file for complete search history.

(56) References Cited

U.S. PATENT DOCUMENTS

| 2017/0017085 | A1* | 1/2017 | Araki ................. G02B 27/0176 |
| 2017/0315611 | A1 | 11/2017 | Mikhailov et al. |
| 2018/0027676 | A1 | 1/2018 | Araki et al. |

FOREIGN PATENT DOCUMENTS

| JP | 09292588 | 11/1997 |
| JP | 09304724 | 11/1997 |
| WO | 2015137165 | 9/2015 |

OTHER PUBLICATIONS

PCT International Application No. PCT/KR2018/003887, International Search Report dated Jan. 4, 2019, 2 pages.

* cited by examiner

*Primary Examiner* — Alexander Eisen
*Assistant Examiner* — Cory A Almeida
(74) *Attorney, Agent, or Firm* — Lee, Hong, Degerman, Kang & Waimey

(57) ABSTRACT

The present disclosure relates to a head mounted display comprising: a body mounted on a user's facial region and including a display for providing image information; and a wearable member configured to support the body and be mounted on the user's head, wherein the wearable member comprises: a front band part formed to have a rounded shape so as to be stably placed on the front of the user's head; hinge members supporting both ends of the body and allowing the body to be pivoted upward/downward or slid forward/backward; and a rear band part formed to surround the back of the user's head, fixed to both sides of the front band part, and configured to support the hinge members when the hinge members move.

16 Claims, 9 Drawing Sheets

HEAD MOUNTED DISPLAY

CROSS-REFERENCE TO RELATED APPLICATIONS

This application is the National Stage filing under 35 U.S.C. 371 of International Application No. PCT/KR2018/003887, filed on Apr. 3, 2018, which claims the benefit of earlier filing date and right of priority to Korean Application No. 10-2018-0034016, filed on Mar. 23, 2018, the contents of which are all hereby incorporated by reference herein in their entirety.

TECHNICAL FIELD

The present disclosure relates to a Head Mounted Display (HMD) capable of operating a wearable member to fit a user.

BACKGROUND ART

Terminals may be divided into glass-type terminals and stationary terminals according to mobility. Also, the glass-type terminals may be classified into handheld types and vehicle mount types according to whether or not a user can directly carry.

As functions are diversified, a mobile terminal can be allowed to capture still images or moving images, play music or video files, play games, receive broadcast and the like, so as to be implemented as an integrated multimedia player. A wearable glass type terminal which is wearable on a part of a human body is recently developed.

A glass type terminal worn on a user's head may correspond to a head mounted display (HMD). A display provided on a glass type terminal such as the HMD may provide various conveniences to a user by combining with an augmented reality technology, an N-screen technology and the like beyond a simple image output function.

The HMD should be worn on a user's head using a wearable member coupled to a body. Also, the body of the HMD should stably fit the user's head and adjusted to be suitable for the user. To provide such functions in the related art HMD, the wearable member employed a complicated structure needing more components. This causes an increase in a manufacturing cost or difficulty in fine adjustment for sliding or tilting the body.

Accordingly, there is a user's demand on a structure that is capable of realizing movement of a body of an HMD by a simple operation, allowing the body including a display to be smoothly slid and tilted to provide normal images to the user after the user wears the HMD, and even securing convenience of wearing the body by tightening or loosening a wearable member on the user's head.

DISCLOSURE

Technical Problem

One aspect of the present disclosure is to provide a structure of a head mounted display (HMD) capable of implementing forward/backward movement or upward/downward movement of a body after being worn on a user's head.

Another aspect of the present disclosure is to provide a structure of an HMD capable of facilitating the HMD to be worn or taken off by tightening or loosening a wearable member on a user's head.

Still another aspect of the present disclosure is to provide a structure of an HMD capable of facilitating a user to move a body and smoothly tilt and slide the body to fit him or her after wearing the body, thereby securing convenience of operation.

Technical Solution

To achieve these and other advantages and in accordance with the purpose of the present invention, as embodied and broadly described herein, there is provided a Head Mounted Display (HMD) that may include a body mounted on a user's facial region and including a display for providing image information, and a wearable member configured to support the body and be mounted on the user's head. The wearable member may include a front band part formed to have a rounded shape so as to be stably placed on the front of the user's head, hinge members supporting both ends of the body and allowing the body to be pivoted upward/downward or slid forward/backward, and a rear band part formed to surround the back of the user's head, fixed to both sides of the front band part, and configured to support the hinge members when the hinge members move.

According to one implementation, the rear band part may include a rear band extending to have a predetermined length so as to be tightened on the rear of the user's head, slide rails located to surround an outer surface of the rear band, and configured to move along the outer surface of the rear band when the hinge members slide, and a rear band cover coupled to the rear band so that an inner surface thereof is located on outer sides of the slide rails.

According to one implementation, the rear band cover may be provided on the inner surface thereof with a slide rail guide groove extending by a predetermined depth along a direction that the rear band cover extends. The slide rails may slide with being supported by the slide rail guide groove.

According to one implementation, the rear band cover may be provided with a support bracket inserted into the rear band cover to support the slide rails located in the slide rail guide groove.

Also, the hinge members may include a first hinge member supporting one end portion of the body and a second hinge member supporting another end portion of the body. The slide rails may include a first slide rail coupled to the first hinge member, and a second slide rail coupled to the second hinge member and extending toward the first slide rail.

According to one implementation, the first slide rail may be provided with a first gear portion formed downward on one end portion thereof, and the second slide rail may be provided with a second gear portion formed upward on one end portion thereof to face the first gear portion. The first gear portion and the second gear portion may be brought into contact with a rotation gear to allow relative movement of the first and second slide rails.

According to one implementation, the first gear portion and the second gear portion may rotate with being engaged with the rotation gear, in response to the forward and backward sliding of the hinge members, so that the first slide rail and the second slide rail move forward and backward along the slide rail guide groove.

According to one implementation, the rear band cover may be provided with a rotation gear accommodation protrusion protruding toward the rear band so that the rotation gear is inserted therein.

According to one implementation, a rotation limiting member may be inserted into the rotation gear accommodation protrusion to limit the rotation of the rotation gear.

According to one implementation, the wearable member may further include a base portion coupled to the front band part and having a shape corresponding to the front of the user's head.

The wearable member may further include a cushion portion coupled to the base portion and configured to absorb shock.

According to one implementation, the hinge member may include a first member having a first through hole formed through a central portion thereof, and having one side coupled to the body to be rotatable.

The hinge member may further include a second member having a second through hole formed through a central portion thereof to correspond to the first through hole, and having a mounting surface brought into contact with the first member, a support shaft disposed to pass through the first through hole and the second through hole, and a third member formed in a plate-like shape and fixed to the support shaft.

According to one implementation, the front band part may include front band rails disposed on both ends thereof. The front band part may include a front band adjustment portion configured to move the front band rails to be tightened on the user's head. The front band adjustment portion may implement the movement of the front band rails by applying a predetermined tensile force to the front band rails while supporting the front band rails.

According to one implementation, the front band adjustment portion may include a dial member supporting the respective front band rails. The dial member may include a holder formed in a cylindrical shape having an opening at one end thereof, and provided with an insertion hole formed through a central portion thereof so that a guide pin is inserted, and a gear support groove formed along an inner circumferential surface thereof, a main dial disposed to cover the opening and configured to be rotated by a user in one direction, a first gear coupled to the guide pin, engaged with the gear support groove, and configured to rotate while an outer surface thereof is brought into contact with the gear support groove when the main dial is rotated, and a second gear fixed to one end of the guide pin, allowing the movement of the front band rails in response to the rotation of the first gear, and configured to apply the predetermined tensile force to the front band rails.

According to one implementation, the gear support groove may be provided with a thread formed in one direction to allow the rotation of the first gear only in the one direction.

According to one implementation, when the main dial is rotated by a preset angle, the front band rails may move to right and left by a distance corresponding to the rotation.

The first gear may be separated from the gear support groove when the main dial is pressed, so that the tensile force applied to the front band rail by the second gear is removed, thereby achieving user convenience of wearing the HMD.

Advantageous Effects

Hereinafter, effects of a Head Mounted Display (HMD) device according to the present disclosure will be described.

In an HMD according to one implementation, the movement of a body can be made to fit a user in a manner of rotating the body by a preset angle or sliding the body back and forth by use of hinge members. Accordingly, ER (eye relief) can be smoothly adjusted and the body can be tightened on the user's head through the sliding of the body, thereby preventing separation of the body and providing comfortable feeling during use.

A front band part can implement the movement of front band rails by use of a front band adjustment portion, and can be tightened on the user's head or be easily loosened on the user's head by operating a dial member provided on the front band adjustment portion.

Even if the body moves back and forth as hinge members slide, slide rails provided on a rear band part can move along a slide rail guide groove with being engaged with a rotation gear, which may result in preventing the rear band part from being separated to outside or being twisted in a right-left direction.

MODES FOR CARRYING OUT PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

The HMD described in this specification may include a wearable device (e.g., a smart glass) and the like.

However, it will be easily understood by those skilled in the art that the configuration according to the implementations described herein, unless otherwise limited to a case of being applicable only to the HMD, may be applied to mobile terminals, such as mobile phones, smart phones, laptop computers, digital broadcasting terminals, personal digital assistants (PDAs), personal digital assistants (PMPs), navigators, slate PCs, tablet PCs, ultrabooks, smartwatches, and the like.

Figure 1:
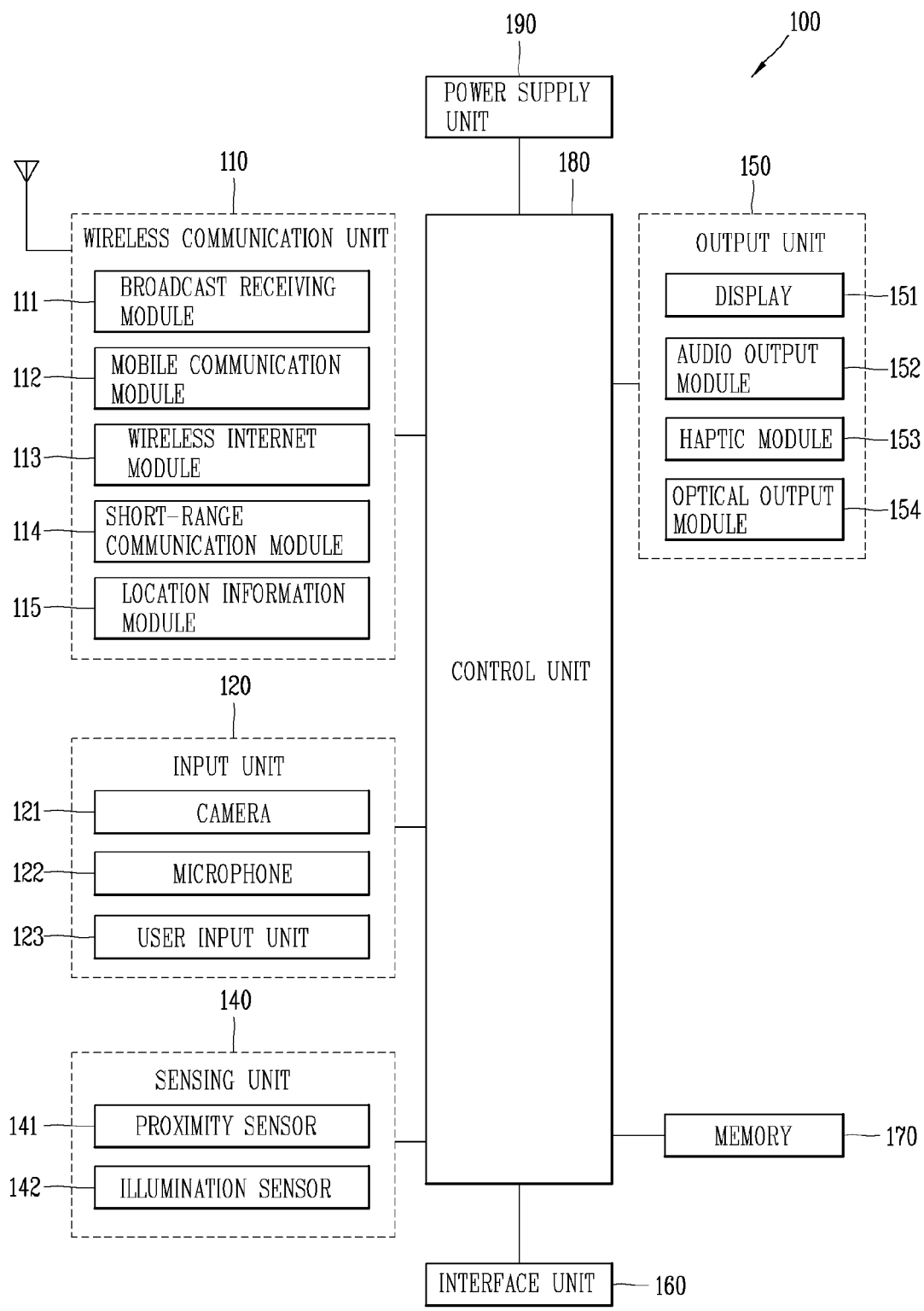
FIG. 1 is a block diagram of a Head Mounted Display (HMD) in accordance with the present disclosure.

FIG. 1 is a block diagram of a Head Mounted Display (HMD) in accordance with the present disclosure.

The HMD 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement. Greater or fewer components may alternatively be implemented.

More specifically, among those components, the wireless communication unit 110 may include at least one module for allowing wireless communication between the HMD 100 and a wireless communication system, between the HMD 100 and another HMD, between the HMD 100 and a mobile or stationary terminal, between the HMD 100 and a control device, between the HMD 100 and a camera externally installed to perform wireless communication, or between the HMD 100 and an external server.

Further, the wireless communication unit 110 may typically include one or more modules which connect the HMD 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the HMD, the surrounding environment of the HMD, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The HMD 100 disclosed herein may be configured to utilize information obtained from one or more sensors, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154.

The interface unit 160 serves as an interface with various types of external devices that can be coupled to the HMD 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the HMD 100 may perform assorted control functions associated with a connected external device, in response to the external device being connected to the interface unit 160.

The memory 170 is typically implemented to store data to support various functions or features of the HMD 100. For instance, the memory 170 may be configured to store application programs executed in the HMD 100, data or instructions for operations of the HMD 100, and the like. Some of these application programs may be downloaded from an external server via wireless communication. Other application programs may be installed within the HMD 100 at time of manufacturing or shipping, which is typically the case for basic functions of the HMD 100 (for example, receiving a call, placing a call, receiving a message, sending a message, and the like). Application programs may be stored in the memory 170, installed in the HMD 100, and executed by the controller 180 to perform an operation (or function) for the HMD 100.

The controller 180 typically functions to control an overall operation of the HMD 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1, to execute an application program that have been stored in the memory 170. In addition, the controller 180 may control at least two of those components included in the HMD 100 to activate the application program.

The power supply unit 190 may be configured to receive external power or provide internal power in order to supply appropriate power required for operating elements and components included in the HMD 100. The power supply unit 190 may include a battery, and the battery may be configured to be embedded in the terminal body, or configured to be detachable from the terminal body.

At least part of the components may cooperatively operate to implement an operation, a control or a control method of an HMD according to various embodiments disclosed herein. Also, the operation, the control or the control method of the HMD may be implemented on the HMD by an activation of at least one application program stored in the memory 170.

Hereinafter, description will be given in more detail of the aforementioned components with reference to FIG. 1A, prior to describing various embodiments implemented through the HMD 100.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be provided in the HMD 100 to facilitate simultaneous reception of two or more broadcast channels, or to support switching among broadcast channels.

The broadcast management server may be a server that generates and transmits a broadcast signal and/or broadcast associated information or a server that receives a previously generated broadcast signal and/or broadcast associated information and transmits the same to a device (e.g., a control device, a terminal, etc.) which is connected to the HMD to control the HMD. The broadcast signal may include a TV broadcast signal, a radio broadcast signal, a data broadcast signal, and the like. Also, the broadcast signal may further include a broadcast signal in a form that a TV or radio broadcast signal is combined with a data broadcast signal.

The broadcast signal may be encrypted by at least one of technical standards (or broadcasting methods, e.g., ISO, IEC, DVB, ATSC, etc.) for transmitting and receiving a digital broadcast signal. The broadcast receiving module 111 may receive the digital broadcast signal using a method suitable for a technical standard selected from those technical standards.

Examples of the broadcast associated information may include information associated with a broadcast channel, a broadcast program, a broadcast service provider, and the like. The broadcast associated information may be provided via a mobile communication network. In this case, the broadcast associated information may be received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like. The broadcast signal and/or the broadcast related information received through the broadcast receiving module 111 may be stored in the memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the electronic device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports, through wireless area networks, wireless communications between the HMD 100 and a wireless communication system, between the HMD 100 and another HMD, between the HMD 100 and a mobile or stationary terminal, between the HMD 100 and a control device, between the HMD 100 and a camera externally installed to perform wireless communication, or between the HMD 100 and an external server. One example of the wireless area networks is a wireless personal area networks.

Here, the HMD may be a device (e.g., a mobile phone, a smart phone, a smartwatch, a laptop computer, a controller, etc.) which can exchange data with (or cooperative with) the HMD 100. The short-range communication module 114 may sense (or recognize) a device, which can perform communication with the HMD 100, in the vicinity of the HMD 100. In addition, when the sensed device is a device which is authenticated to communicate with the HMD 100, the controller 180, for example, may cause transmission of at least part of data processed in the HMD 100 to the device or at least part of data processed in the device to the HMD 100 via the short-range communication module 114.

Hence, a user of the HMD 100 may use the data processed in the device through the HMD 100. For example, when a call is received in the device, the user may answer the call using the HMD 100. Also, when a message is received in the device, the user may check the received message using the HMD 100.

The location information module 115 is a module for acquiring a position (or a current position) of the HMD 100. As an example, the location information module 115 includes a Global Position System (GPS) module or a Wi-Fi module. For example, when the HMD uses a GPS module, a position of the HMD may be acquired using a signal sent from a GPS satellite. As another example, when the HMD uses the Wi-Fi module, a position of the HMD may be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the HMD. The location information module 115 is a module used for acquiring the position (or the current position) of the HMD, and may not be limited to a module for directly calculating or acquiring the position of the HMD.

Next, the input unit 120 is configured to permit various types of inputs to the HMD 100. Examples of such inputs include image information (or signal), audio information (or signal), data or various information input by a user, and may be provided with one or a plurality of cameras 121. Such cameras 121 may process image frames of still pictures or video obtained by image sensors in a video or image capture mode. The processed image frames can be displayed on the display 151 or stored in memory 170. Meanwhile, the cameras 121 provided in the HMD 100 may be arranged in a matrix configuration to permit a plurality of images having various angles or focal points to be input to the HMD 100. Also, the cameras 121 may be located in a stereoscopic arrangement to acquire left and right images for implementing a stereoscopic image.

The microphone 122 processes an external audio signal into electric audio (sound) data. The processed audio data may be processed in various manners according to a function being executed in the HMD 100. If desired, the microphone 122 may include assorted noise removing algorithms to remove unwanted noise generated in the course of receiving the external audio signal.

The user input unit 123 is a component that permits input by a user. Such user input may enable the controller 180 to control an operation of the HMD 100. The user input unit 123 may include one or more of a mechanical input element (for example, a mechanical key, a button located on a front and/or rear surface or a side surface of the HMD 100, a dome switch, a jog wheel, a jog switch, and the like), or a touch-sensitive input element, among others. As one example, the touch-sensitive input element may be at least one of a touch pad and a touch panel.

The sensing unit 140 is generally configured to sense one or more of internal information of the HMD, surrounding environment information of the HMD, user information, or the like, and generate a corresponding sensing signal. The controller 180 generally cooperates with the sending unit 140 to control operation of the HMD 100 or execute data processing, a function or an operation associated with an application program installed in the HMD 100 based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the HMD covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch-sensitive input element of the user input unit 123 is implemented as a capacitance type, the proximity sensor 141 may sense proximity of a pointer having conductivity by changes of an electromagnetic field, which is responsive to an approach of the pointer. In this case, the user input unit 123 itself may also be categorized as a proximity sensor.

The term "proximity touch" will often be referred to herein to denote a motion (action) that the pointer is closely located above the user input unit 123 without being in contact with the user input unit 123. The term "contact touch" will often be referred to herein to denote a motion (action) that the pointer is actually brought into contact with the user input unit 123. For the position corresponding to the proximity touch of the pointer relative to the user input unit 123, such position will correspond to a position where the pointer is perpendicular to the user input unit. The proximity sensor 141 may sense proximity touch, and proximity touch patterns (for example, distance, direction, speed, time, position, moving status, and the like). In general, the controller 180 processes data corresponding to proximity touches and proximity touch patterns sensed by the proximity sensor 141, and cause output of visual information on the display unit 151. In addition, the controller 180 may control the HMD 100 to execute different operations or process different data (or information) according to whether a touch with respect to the same point on the user input unit 123 is either a proximity touch or a contact touch.

A touch sensor senses a touch (or a touch input) applied to the user input unit 123 using at least one of a variety of touch methods. Examples of such touch methods include a resistive type, a capacitive type, an infrared type, an ultrasonic type, and a magnetic field type, among others.

As one example, the touch sensor may be configured to convert changes of pressure applied to a specific part of the user input unit 123, or convert capacitance occurring at a specific part of the user input unit 123, into electric input signals. The touch sensor may also be configured to sense a touch position, a touch area, touch pressure, touch capacitance when a touch object touches the user input unit 123. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the user input unit 123 has been touched. Here, the touch controller may be a component separate from the controller 180, the controller 180, and combinations thereof.

Meanwhile, the controller 180 may execute the same or different controls according to a type of touch object that touches the user input unit 123. Whether to execute the same or different control according to a type of a touch object may be decided based on a current operating state of the HMD 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the HMD 100. For example, the display unit 151 may display execution screen information of an application program executing at the HMD 100 or user interface (UI) and graphic user interface (GUI) information in response to the execution screen information.

Also, the display 151 may be implemented as a stereoscopic display for displaying stereoscopic images.

A typical stereoscopic display may employ a stereoscopic display scheme such as a stereoscopic scheme (a glass scheme), an auto-stereoscopic scheme (glassless scheme), a projection scheme (holographic scheme), or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

A left image and a right image required for implementing a 3D stereoscopic image may be displayed on the stereoscopic display unit by a stereoscopic processing unit. The stereoscopic processing unit may receive the 3D image (an image of a reference time point and an image of an extension time point), and extract the left image and the right image, or may receive 2D images and change them into a left image and a right image.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the HMD 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 may also be implemented to allow the user to feel a tactile effect through a muscle sensation such as the user's head, face, fingers or arm, as well as transferring the tactile effect through direct contact. Two or more haptic modules 153 may be provided according to the particular configuration of the HMD 100.

An optical output module 154 may output a signal for indicating an event generation using light of a light source of the HMD 100. Examples of events generated in the HMD 100 may include a message reception, a call signal reception, a missed call, an alarm, a schedule notice, an email reception, information reception through an application, an output of an image (image, video, etc.) and the like. That is, the optical output module 154 may notify that the HMD 100 is performing a specific operation (function) by the user.

A signal output by the optical output module 154 may be implemented in such a manner that the HMD emits monochromatic light or light with a plurality of colors. The signal output may be terminated in response to the HMD sensing a user's event confirmation, or an operation currently performed in the HMD being ended.

The interface unit 160 serves as an interface for every external device to be connected with the electronic device 100. For example, the interface unit 160 may receive data transmitted from an external device, receive power to transfer to elements and components within the HMD 100, or transmit internal data of the HMD 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the HMD 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the HMD 100 is connected with an external cradle, the interface unit 160 may serve as a passage to allow power from the cradle to be supplied to the HMD 100 or may serve as a passage to allow various command signals input by the user from the cradle to be transferred to the HMD therethrough. Various command signals or power input from the cradle may operate as signals for recognizing that the HMD 100 is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The HMD 100 may also be operated in relation to a network storage device that performs the storage function of the memory 170 over a network, such as the Internet.

The controller 180 may typically control operations relating to application programs and the general operations of the HMD 100. For example, the controller 180 may set or release a lock state for restricting a user from inputting a control command with respect to applications when a status of the HMD meets a preset condition.

The controller 180 may also perform the controlling and processing associated with voice calls, data communications, video calls, and the like, or perform pattern recognition processing to recognize a handwriting input or a picture drawing input performed on the touch screen as characters or images, respectively. In addition, the controller 180 may control one or a combination of those components in order to implement various exemplary embodiments disclosed herein on the HMD 100 according to the present invention.

The power supply unit 190 receives external power or provides internal power and supply the appropriate power required for operating respective elements and components included in the HMD 100 under the control of the controller 180. The power supply unit 190 may include a battery, which is typically rechargeable or be detachably coupled to the HMD Body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

[Standard End]

Figure 2:
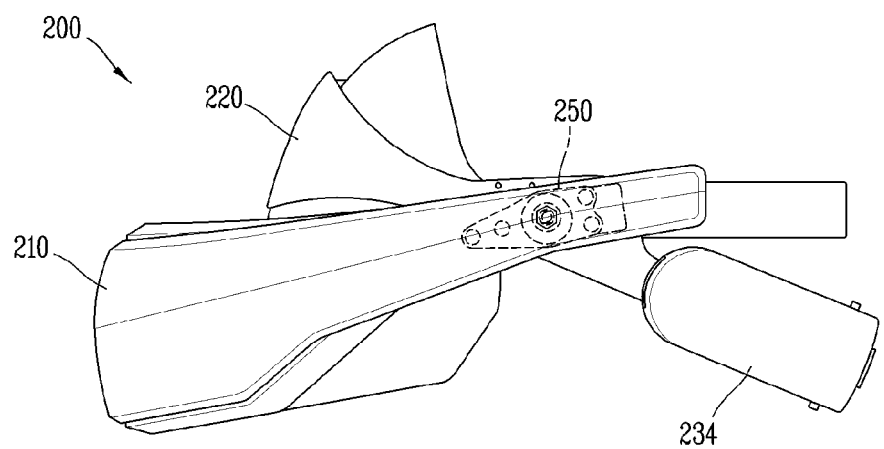
FIG. 2 is a perspective view of an HMD in accordance with one implementation, viewed from outside.

FIG. 2 is a perspective view of an HMD in accordance with one implementation, viewed from outside.

A Head Mounted Display (HMD) 200 according to one implementation may be configured to be worn on a user's head (or face), and intended to provide image information to the user.

The HMD 200 may include a body (or main body) 210 placed on the user's face, a wearable member 220 connected to the body 210 to support the body and configured to support the body 210 while being worn on the user's head.

A display (not shown) that outputs image information may be disposed inside the body 210 to provide the image information to both eyes of the user. The body 210 may have an inner space for mounting various electronic components. Examples of the electronic components may include the camera 121, the output unit, the user input units 123 and 223, the controller 180, and the sensing unit (refer to FIG. 1). The controller 180 (see FIG. 1) may be configured to control those various electronic components included in the HMD 200.

A display 251 may receive a transmitted signal and output an image with respect to the received signal. The display 251 may output screen information (e.g., image, video, etc.) in front of the user's eyes. When the user wears the HMD 200, the display 251 may be arranged to face at least one of the left eye and the right eye so that screen information or image can be displayed directly in front of the user's eye. Also, the display 251 may project an image to the user's eye using a prism. Further, the prism may be transmissive so that the user can view the projected image and a general front view (a range viewed by the user through the eyes) together.

As described above, the image output through the display 251 may be viewed in a manner of overlapping the general view. The HMD 200 may provide Augmented Reality (AR), in which a virtual image is superimposed on a real image or a background to be viewed as a single image, by using the characteristics of the display.

The camera 121 installed in the body 210 may disposed adjacent to at least one of the left and right eyes to capture an image of the front. The camera 121 may acquire a scene that the user is viewing as an image because it is disposed to face the front in the vicinity of the user's eye. Alternatively, one or more cameras may be provided to acquire a stereoscopic image.

The HMD 200 may include a user input unit (not shown) that is mounted on a portion of the body 210 to receive an input control command applied by the user in a tactile manner such as touching or pushing.

The user input unit (not shown) may receive the user's preset gesture with respect to the HMD 200, a preset movement of the body 210, etc. as a control command. To this end, the user input unit 223 may include at least one sensor.

For example, the sensor may include a gyro sensor or an acceleration sensor to detect the movement of the body 210 such as rotation or tilting. In addition, a camera or an infrared sensor for detecting the user's preset gaze as the user's preset gesture may additionally be provided.

When a control command is input through the user input unit (not illustrated), the controller may control at least one of the display 251 and a sound output module 252 based on the control command.

In addition, the HMD 200 may be provided with a microphone (not illustrated) for receiving sound and processing the sound into electric audio data, and an audio output module (not illustrated) for outputting sounds. The sound output module 252 may transmit an audible signal related to image information to the user, and may be configured in the form of an earphone that is put on or taken off from the user's ears.

The HMD 200 may include a wearable member 220 that supports both sides of the body 210 and allows the body 210 to be tightened on or loosened from the user's head.

The user may wear the body 210 by using the wearable member 220. The user may wear the body 210 to fit a facial region by rotating (or tilting) the body 210 coupled to the wearable member 223 up and down centering on hinge members 150 so that the body 210 is spaced apart from the user's facial region, or by sliding the body 210 back and forth using the hinge members 150. In addition, the wearable member 220 may apply pressure on or release the pressure from the user's head by using a front band adjustment portion 234. Accordingly, convenience of wearing can be secured.

Figure 3A:
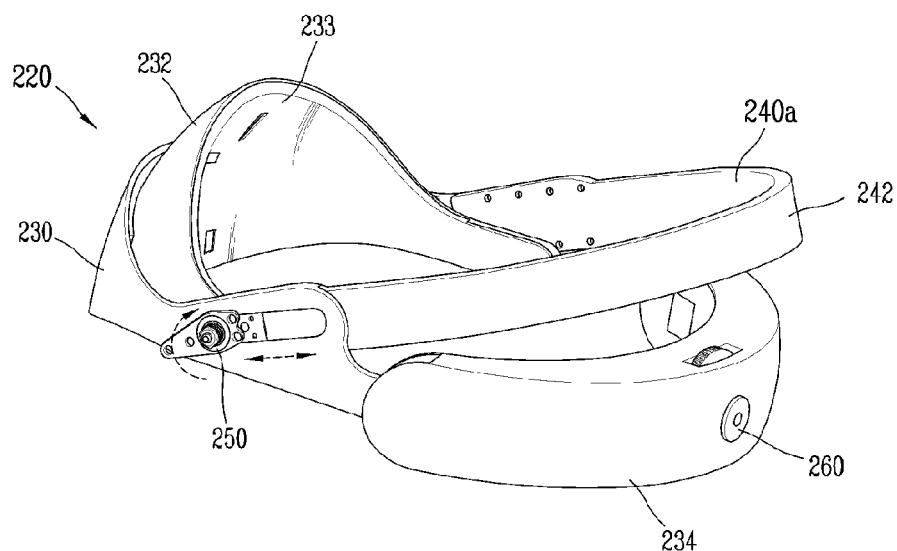
FIG. 3A is a perspective view illustrating a wearable member of an HMD in accordance with the present disclosure.

FIG. 3A is a perspective view illustrating the wearable member 220 of the HMD 200 in accordance with the present disclosure.

The HMD 200 may include the body 210 and the wearable member 220, and the wearable member 220 may be worn on the user's head and serve to support the body 210.

Figure 3B:
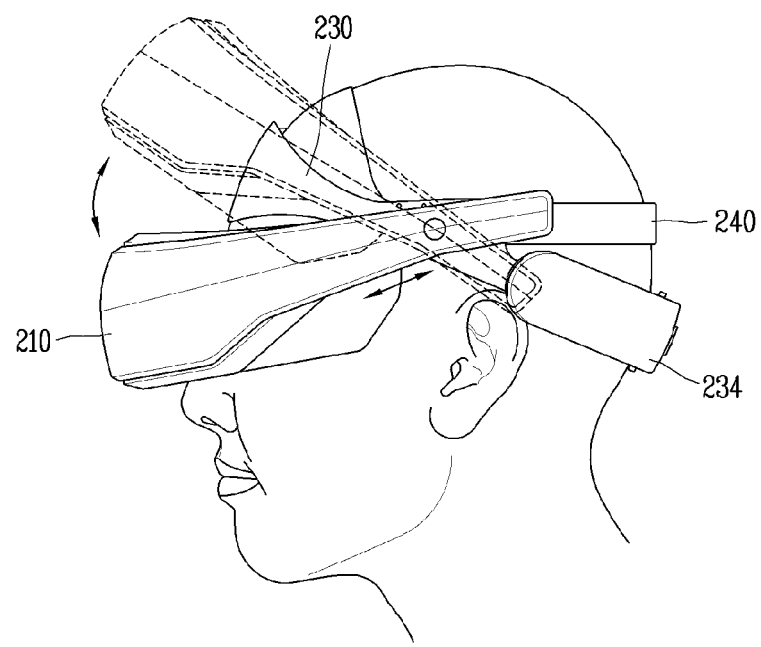
FIG. 3B is a conceptual view illustrating a state of implementing a behavior of a body after a user wears an HMD.

The wearable member 220 may include a front band part 230, a rear band part 240, and hinge members 250. As illustrated in FIG. 3B, when the user wears the HMD 200, the front band part 230 may be placed on the front of the user's head and the rear band part 240 may be placed on the rear of the user's head.

Since the HMD 200 is made so that both ends of the body 210 are coupled to the hinge members 250, respectively, the body 210 may be moved by the operation of the hinge members 250.

The hinge members 250 may be located on both sides of the front band part 230, respectively, and rotatable centering on support shafts 254 so that the body 210 can rotate in a vertical direction as illustrated in FIG. 3B. Here, the vertical direction refers to an upper side and a lower side based on the front of the user.

The movement of the body 210 using the hinge members 250 may be useful when the user desires to perform another operation after raising the body 210 without completely taking the HMD 200 off during the use of the HMD 200, and also enable an operation of tilting the body 210 by a predetermined angle. A tilting angle may be set to be about 90 degrees, and the hinge members 250 may support the load of the body caused due to the tilting.

In addition, the hinge members 250 may be configured to be slidable back and forth, so that the body 210 can slide forward and backward (i.e., in the front-rear direction). As illustrated in FIG. 3B, the body 210 may slide back and forth so as to be more brought into contact with (tightened on) the user's facial region or spaced apart (loosened) from the user's facial region. Here, the front-rear direction refers to the front and rear of the user's face. By sliding the body 210 back and forth, a space between an inner side of the body 210 and the user's facial region can be used, which may facilitate a user who wears glasses to wear the body 210 at the facial region.

Figure 4:
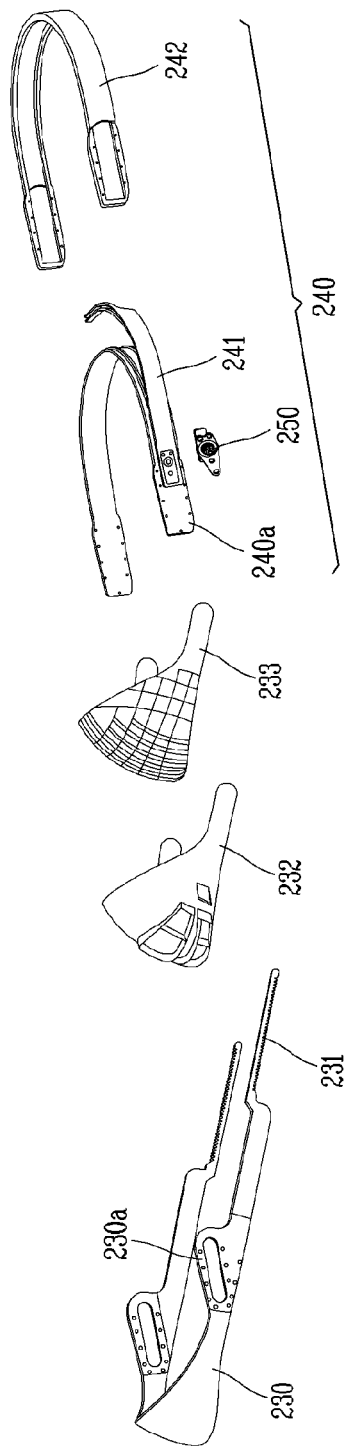
FIG. 4 is an exploded view illustrating the wearable member according to FIG. 3A.

FIG. 4 is an exploded view illustrating the wearable member 220 according to FIG. 3A.

The wearable member 220 may include the front band part 230, the rear band part 240, and the hinge members 250. The wearable member 220 may be worn on the user's head and serve to support the body 210.

The front band part 230 may have a structure that is placed on the front of the user's head, and the rear band part 240 may have a structure that is placed on the rear of the user's head. The front band part 230 may apply pressure on the user's head by the front band adjustment portion 234, so as to be stably fixed to the head. The front band part 230 and the rear band part 240 may be coupled to each other to configure a ring-shaped band to be worn around the user's head.

The front band part 230 may be mounted on the front of the user's head and may be rounded to surround and support the front side of the user's head. The front band part 230 may have a seating surface on which the front of the user's head is placed. A base portion 232 and a cushion portion 233 may be coupled to the seating surface so that the front of the user's head can be placed.

The base portion 232 may be rounded at a predetermined curvature to fit the user's head. The cushion portion 233 may be coupled to an inner surface of the base portion 232 to be brought into contact with the user's head. The cushion portion 233 may be made of a material capable of absorbing an impact. For example, the cushion portion 233 may be made of a material such as Styrofoam that is easy to absorb shock, but the material may not be limited.

The front band part 230 may surround the front side of the user's head and extend from the front of the user's head toward the rear of the user's head. Exposure holes 230a may be formed through both sides of the front band part 230 so that the hinge members 250 may be positioned. The hinge members 250 may be exposed to outside through the exposure holes 230a.

Front band rails 231 may be provided on both ends of the front band part 230. The front band rails 231 may receive a tensile force by the front band adjustment portion 234 so as to apply pressure on the user's head. Accordingly, the front band rails 231 may be firmly fixed to the user's head. A dial member 260 for providing the tensile force to the front band rails 231 may be disposed on one portion of the front band adjustment portion 234. The front band rails 231 may be formed in a shape in which concave-convex portions are repeatedly formed at predetermined intervals. Right and left movements of the front band rails 231 may be made when the front band rails 231 are rotated by a preset angle in response to the rotation of a main dial 263.

The rear band part 240 may be formed to surround the rear of the user's head, and may be fixed to both sides of the front band part 230. The rear band part 240 may include a rear band 240a, slide rails 241, and a rear band cover 242.

The rear band 240a may be formed in a band shape having a predetermined length to be tightened on the rear of the user's head, and may be configured to apply pressure on the rear side of the user's head as the slide rail 241 slides.

The slide rails 241 may be located on an outer surface of the rear band 240a to surround the outer surface of the rear band 240a. The slide rails 241 may be configured to move along the outer surface of the rear band 240a when the hinge members 250 slide.

The rear band cover 242 may have an inner surface located outside the slide rails 241, and may be coupled to the rear band 240a to prevent exposure of the slide rails 241. The rear band cover 242 may have a shape surrounding the outer surface of the rear band 240a, and may be configured to cover the outer surface of the rear band 240a.

The hinge members 250 may be coupled to both ends of the body 210, respectively. The hinge members 250 may be configured to be rotatable centering on support shafts 254 so that the body 210 can be tilted upward and downward, and also configured to be slidable forward and backward so that the body 210 can move forward and backward. Accordingly, the body 210 can be freely tilted and slid.

This may result in enhancing convenience of operating the body 210. A detailed description of the hinge member 250 will be described later.

Figure 5:
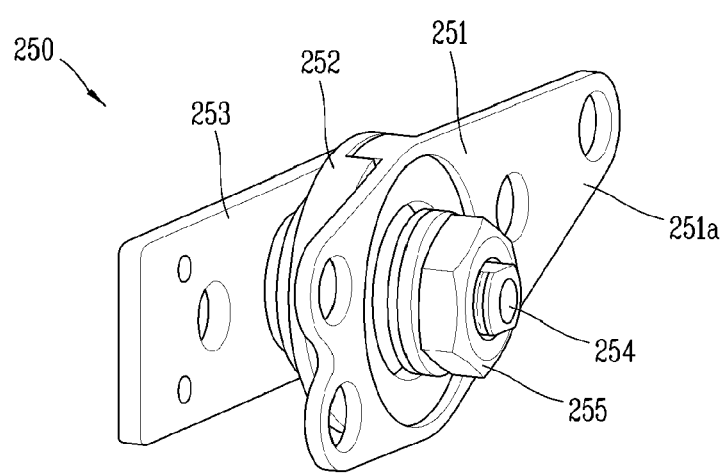
FIG. 5 is a perspective view illustrating a hinge member.
Figure 6:
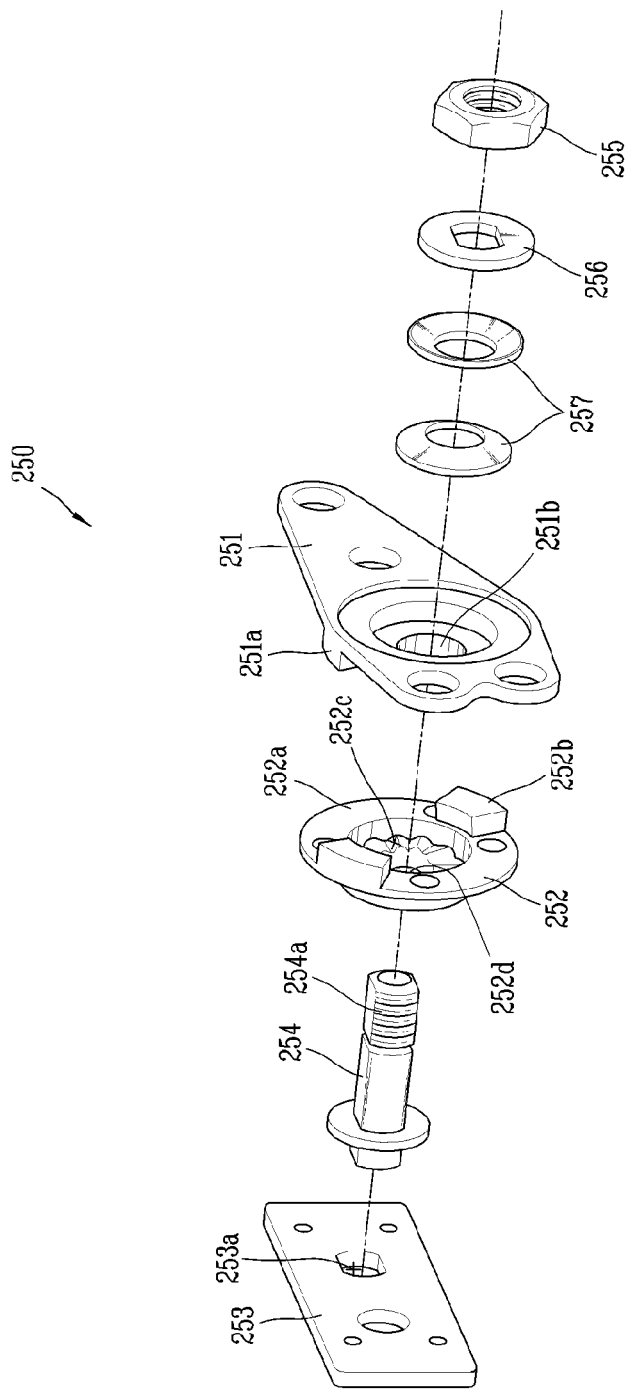
FIG. 6 is an exploded view of the hinge member.

FIG. 5 is a perspective view illustrating the hinge member 250, and FIG. 6 is an exploded view of the hinge member 250.

The hinge members 250 may include a first hinge member and a second hinge member coupled to both end portions of the body 210, respectively. Here, it indicates that the first hinge member is coupled to one end portion of the body 210, and the second hinge member is coupled to another end portion of the body 210. The first hinge member and the second hinge member are intended to refer to the hinge members 250 and may also be collectively referred to as a hinge member. The hinge members 250 may include the first hinge member 250 to which one end portion of the body 210 is coupled and the second hinge member 250 to which another end portion of the body 210 is coupled. This structure may allow for stable behavior of the body 210.

The hinge member 250 may allow the body 210 to rotate up and down or slide back and forth in a manner that one end portion of the hinge member 250 is coupled to one end portion of the body 210. As illustrated in FIG. 5, one end portion of the body 210 may be coupled to a support portion 251a formed on the hinge member 250, so that the behavior of the body 210 can be made according to the behavior of the hinge member 250.

The hinge member 250 may include a first member 251, a second member 252, a third member 253, and a support shaft 254.

The first member 251 may be provided with a first through hole 251b formed through its central portion. One end portion of the body 210 may be coupled to one side of the first member 251. The first member 251 may rotate centering on the support shaft 254 while being brought into contact with the second member 252, so as to realize the movement or behavior of the body 210 in the vertical direction.

The first member 251 may include a support portion 251a protruding from one surface thereof toward the second member 252 so as to rotate while being brought into contact with a mounting surface 252a of the second member 252. The support portion 251a may be slidable between rotation limiting portions 252b of the second member 252 along the mounting surface 252a of the second member 252. When the support portion 251a slides along the mounting surface 252a, the first member 251 may rotate centering on the support shaft 254.

The second member 252 may include a second through hole 252d formed through a central portion thereof to correspond to the first through hole 251b, and a mounting surface 252a brought into contact with the first member 251. The support shaft 254 may be inserted through the second through hole 252d, and the rotation of the second member 252 may be limited by the second through hole 252d.

As illustrated in FIG. 6, the second member 252 may be disposed to face the first member 251. In this case, the mounting surface 252a of the second member 252 and the support portion 251a of the first member 251 may be disposed to be brought into contact with each other.

The rotation limiting portions 252b may protrude from one surface of the second member 252 facing the first member 251. The rotation limiting portions 252b may serve to limit a distance by which the support portion 251a is slidable along the mounting surface 252a. When the sliding distance of the support portion 251a is limited by the rotation limiting portions 252b, an angle at which the first member 251 is rotatable centering on the support shaft 254 may also be limited.

The support shaft 254 may be aligned to pass through the first through hole 251b and the second through hole 252d, and may also be aligned to be inserted through a support shaft insertion hole 253a formed through the third member 253. The support shaft 254 may be fixed to the second member 252 and the third member 253. The support shaft 254 may be provided with a thread 254a formed on one end portion thereof and having a nut 255 coupled thereto to prevent separation of the first member 251 and the second member 252 after the support shaft 254 is inserted through the first through hole 251b and the second through hole 252d. The nut 255 may be coupled to the thread 254a. In addition, a washer 256 and a disk spring 257 may be disposed between the thread 254a and the nut 255 to prevent abrasion due to the rotation of the first member 251.

Figure 7:
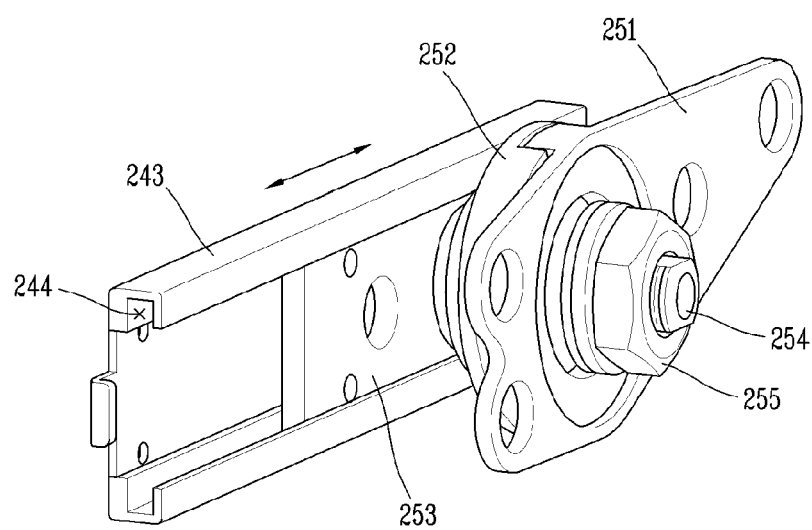
FIG. 7 is a perspective view illustrating a state in which the hinge member slides.

The third member 253 may have a plate-like shape, and may include a support shaft insertion hole 253a through which one end portion of the support shaft 254 is fixedly coupled. As illustrated in FIG. 7, the third member 253 may be slidable along an inner side of a guide member 243 supporting the third member 253.

Since the third member 253 supports the first member 251, the support shaft 254, and the second member 252 fixed to the support shaft 254, when the third member 253 slides, the first member 251, the support shaft 254, and the second member 252 may slide together with the third member 253.

When the third member 253 slides along the guide member 243, forward and backward movement of the body 210 coupled to the first member 251 may be made. A distance by which the third member 253 slides may be arbitrarily set.

The guide member 243 may be disposed on each of both sides of the rear band 240a to allow the sliding of the third member 253. The guide member 243 may be provided with guide grooves 244 formed in a sliding direction of the third member 253 so that the third member 253 can slide after being inserted into the guide member 243.

The third member 253 may be slidable along the guide grooves 244 of the guide member 243. Accordingly, the body 210 coupled to the first member 251 can move forward and backward.

Figure 8:
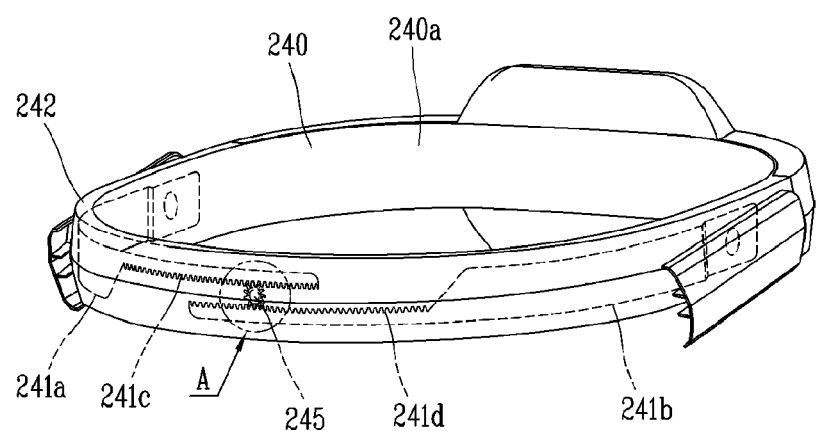
FIG. 8 is a perspective view illustrating a rear band part.
Figure 9:
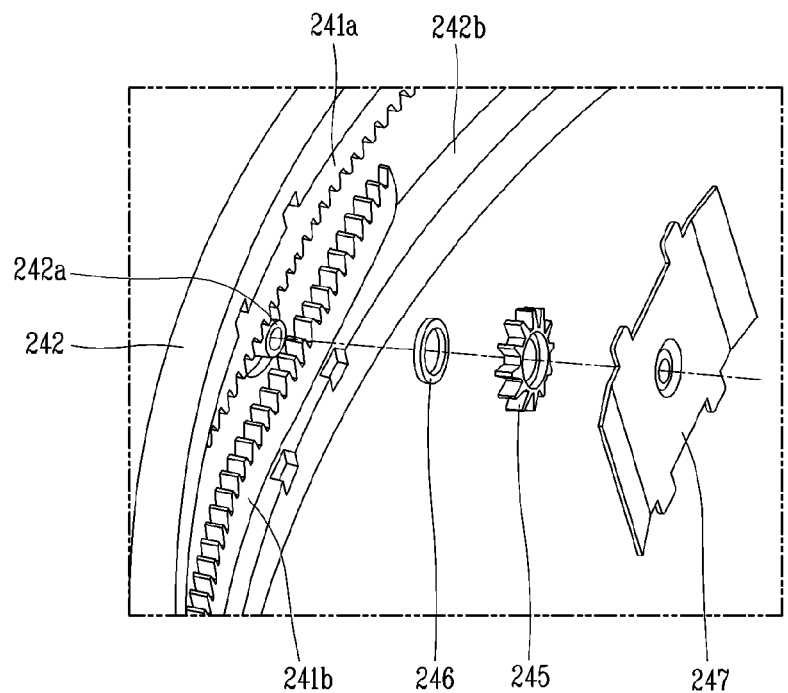
FIG. 9 is an exploded perspective view illustrating a state in which first and second slide rails are located inside a rear band cover.

FIG. 8 is a perspective view illustrating the rear band part 240, and FIG. 9 is an exploded perspective view illustrating a state in which first and second slide rails 241 are located inside the rear band cover 242.

As described above, the rear band part 240 may be formed to surround the rear of the user's head, and fixed to the both sides of the front band part 230. Also, the rear band part 240 may serve to support the hinge members 250 while allowing the hinge members 250 to slide.

The rear band part 240 may include a rear band 240a formed in a band shape having a predetermined length to be tightened on the rear of the user's head, a slide rail 241 surrounding an outer surface of the rear band 240a and configured to move along the outer surface of the rear band 240a when the hinge members 250 slide, and a rear band cover 242 coupled to the rear band 240a at the outer sides of the slide rails 241 so as to cover the slide rails 241.

A slide rail guide groove 242b that extends by a predetermined depth in a direction that the rear band cover 242 extends may be formed in an inner surface of the rear band cover 242. The slide rails 241 may be slidable while being supported in the slide rail guide groove 242b.

The slide rails 241 may include a first slide rail 241 having one end coupled to the first hinge member 250, and a second slide rail 241 having another end coupled to the second hinge member 250 and extending toward the first slide rail 241 to correspond to the first slide rail 241.

A first gear portion 241c may be formed downward on one end portion of the first slide rail 241, and a second gear portion 241d may be formed upward on one end portion of the second slide rail 241 to face the first gear portion 241c.

With the configuration of the HMD 200, when each slide rail 241 moves in the front-rear direction in response to the sliding of the hinge members 250, the first slide rail 241 and the second slide rail 241 may move relative to each other while the first gear portion 241c and the second gear portion 241d are brought into contact with the rotation gear 245. As the hinge members 250 slide back and forth, the slide rails 241 may move by a predetermined distance due to the rotation gear 245 that rotates along the first gear portion 241c and the second gear portion 241d. Accordingly, the rear band 240a can be prevented from being twisted in a right-left direction.

When the body 210 is tightened on the user's facial region, the hinge members 250 may move backward along the guide members 243. In this instance, the first slide rail 241 and the second slide rail 241 may move close to each other, and the rotation gear 245 may rotate in a first direction. Similarly, when the first slide rail 241 and the second slide rail 241 move in a direction away from each other, the rotation gear 245 may rotate in a second direction between the first gear portion 241c and the second gear portion 241d.

As illustrated in FIG. 9, the rear band cover 242 may be provided with a rotation gear accommodation protrusion 242a protruding toward the rear band 240a so that the rotation gear 245 is inserted therein.

In addition, a rotation limiting member 246 may be fitted to the rotation gear accommodation protrusion 242a to limit the rotation of the rotation gear 245.

The first slide rail 241 and the second slide rail 241 may be located in the slide rail guide groove 242b formed in the rear band cover 242 so as to be supported. The first slide rail 241 and the second slide rail 241 may move along the slide rail guide groove 242b.

In addition, the rear band part 240 may further include a support bracket 247 disposed to be inserted into the rear band cover 242 to support each slide rail 241 located in the slide rail guide groove 242b. The support bracket 247 may be coupled to the rear band cover 242 in a manner of being inserted into a coupling groove (not illustrated) formed in the rear band cover 242. The support bracket 247 may prevent the separation of the first slide rail 241 and the second slide rail 241.

Figure 10:
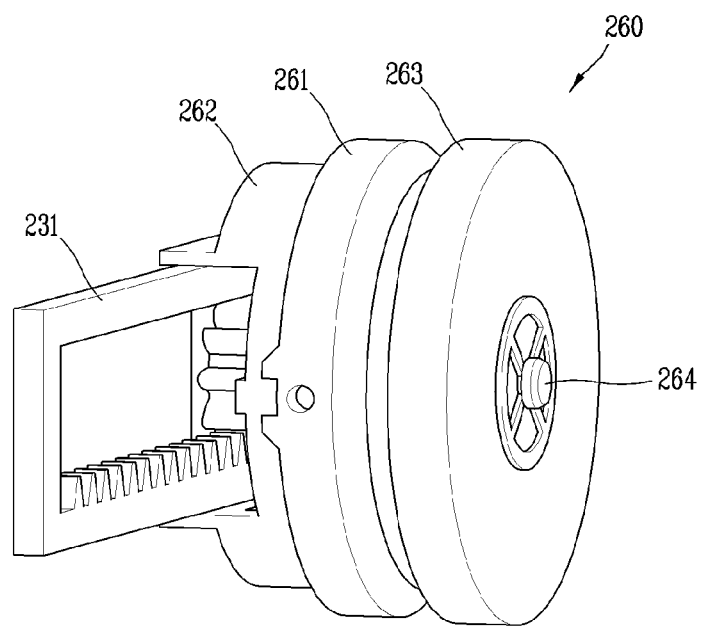
FIG. 10 is a perspective view illustrating a dial member disposed on a front band adjustment portion.

FIG. 10 is a perspective view illustrating the dial member 260 disposed on the front band adjustment portion 234.

The front band part 230 may be placed on the front of the user's head and may be rounded to surround and support the front side of the user's head. The front band part 230 may have a seating surface on which the front of the user's head may be placed, and the base portion 232 and the cushion portion 233 may be coupled to the seating surface so that the front of the user's head can be placed. The front band part 230 may surround the front side of the user's head and extend from the front of the user's head toward the rear of the user's head.

The front band rails 231 may be provided on both end portions of the front band part 230. The front band rails 231 may receive a tensile force that is applied by the front band adjustment portion 234 so as to apply pressure on the user's head. Accordingly, the front band part 230 may be firmly fixed to the user's head. Specifically, the front band part 230 may be tightened on the user's head by moving the front band rails 231, so as to stably fit the user's head.

The front band adjustment portion 234 may allow the movement of the front band rails 231 by providing a predetermined tensile force to the front band rails 231 while supporting the respective front band rails 231 formed on the both end portions of the front band part 230. The front band adjustment portion 234 may include a dial member 260 for applying the tensile force to each front band rail 231.

As illustrated in FIG. 10, the dial member 260 for providing the tensile force to the front band rails 231 may be installed on one portion of the front band adjustment portion 234. The front band rails 231 may be formed in a shape in which concave-convex portions are repeatedly formed at predetermined intervals. The front band rails 231 may move in the right-left direction with being supported by a second gear 266 provided at an inner side of the dial member 260 when a main dial 263 is rotated by a preset angle.

When the main dial 263 is rotated by a preset angle, the front band rails 231 may move in a direction close to or away from each other, so as to be tightened on the user's head or spaced apart from the user's head.

Figure 11A:
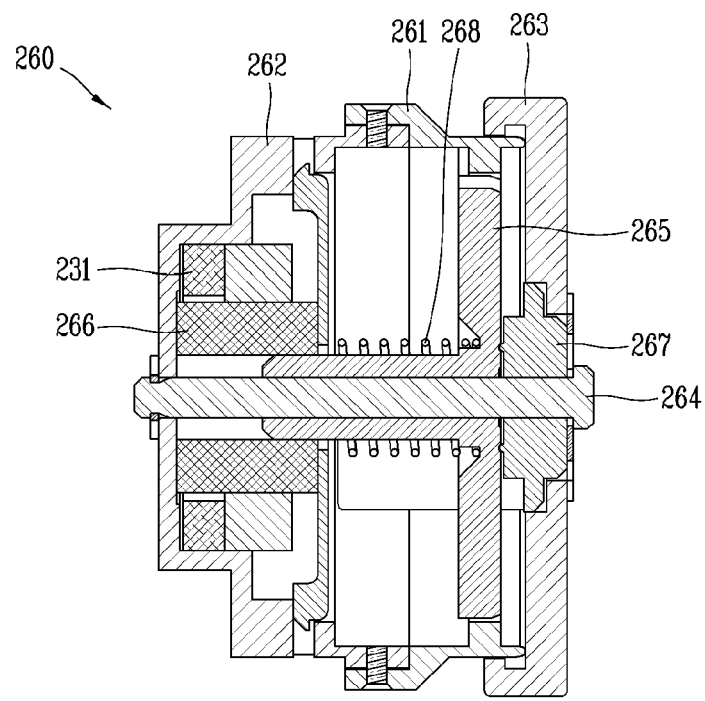
FIGS. 11A and 11B are sectional views each illustrating an internal structure of the dial member.
Figure 11B:
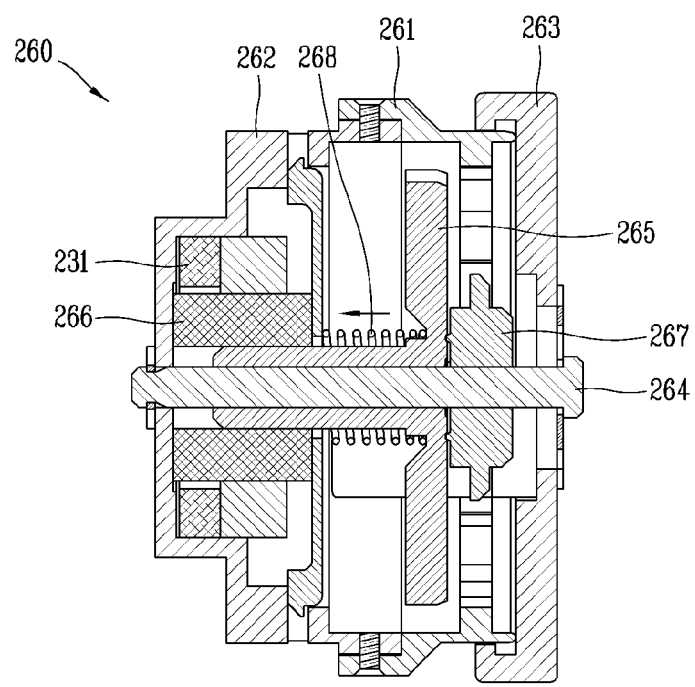

FIGS. 11A and 11B are cross-sectional views illustrating an internal structure of the dial member 260.

The dial member 260 may include holders 261 and 262, a main dial 263, a first gear 265, and a second gear 266.

The holders 261 and 262 each may have an opening at one end and have a cylindrical shape. The holders may include a first holder 261 and a second holder 262 located to come in contact with each other.

Insertion holes (not illustrated) through which a guide pin 264 is inserted may be formed through central portions of the first holder 261 and the second holder 262, respectively. A gear support groove 261a may be formed in an inner circumferential surface of the first holder 261, and the first gear 265 may be positioned to be engaged with the gear support groove 261a.

The main dial 263 may be configured to cover the opening and to be gripped by a user and rotated in one direction. When the main dial 263 is rotated by a preset angle, the front band rails 231 may move to right and left by a distance corresponding to the rotation.

The first gear 261 may be coupled to the guide pin 264 and engaged in the gear support groove 261a. When the main dial 263 rotates, the first gear 261 may rotate while its outer surface is brought into contact with the gear support groove 261a.

The gear support groove 261a may have a thread formed in one direction such that the first gear 265 may rotate only in the one direction. Accordingly, only when the user grips the main dial 263 and rotates it in any one direction, the first gear 265 may apply a predetermined tensile force to the front band rails 231 in a manner of rotating along the gear support groove 261a. When the first gear 265 does not rotate along the gear support groove 261a, a tensile force may not be applied to the front band rails 231.

The second gear 266 may be disposed on one end portion of the guide pin 2640. The second gear 266 may serve to apply a predetermined tensile force to each front band rail 231 as the front band rails 231 move in response to the rotation of the first gear 265. The respective front band rails 231, which have received the predetermined tensile force, may be tightened on the user's head while moving close to each other.

As illustrated in FIG. 11A, when the user does not operate the main dial 263, the first gear 265 may be located to be engaged with the gear support groove 261a by a spring 268 having elasticity, and the front band rails 231 may be located to be engaged with each other by the second gear 266. Accordingly, the front band rails 231 can be tightened on the user's head while receiving or maintaining a predetermined tensile force.

When the user wants to loosen the front band part 230, the user may push the main dial 263. In this case, as illustrated in FIG. 11B, when the user pushes the main dial 263, the main dial 263 may push the first gear 265 so that the first gear 265 can be released from the gear support groove 261a, and the tensile force applied to the front band rails 231 by the second gear 266 may not be maintained. Therefore, pressure applied on the user's head by the predetermined tensile force that is applied to the front band rails 231 can be removed.

It will be apparent to those skilled in the art that the present invention may be embodied in other specific forms without departing from the spirit or essential characteristics thereof.

Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

INDUSTRIAL AVAILABILITY

The present disclosure may be applied and practiced in an industrial field implementing a Head Mounted Display (HMD) device.

The invention claimed is:

1. A Head Mounted Display (HMD) comprising:
a body mounted on a user's facial region and including a display for providing image information; and
a wearable member configured to support the body and be mounted on the user's head,
wherein the wearable member comprises:
a front band part formed to have a rounded shape so as to be stably placed on the front of the user's head;
hinge members supporting both ends of the body and allowing the body to be pivoted upward/downward and slid forward/backward; and
a rear band part formed to surround the back of the user's head, fixed to both sides of the front band part, and configured to support the hinge members when the hinge members move,
wherein the hinge member comprises:
a first member having a first through hole formed through a central portion thereof, and having one side coupled to the body to be rotatable;
a second member having a second through hole formed through a central portion thereof to correspond to the first through hole, and having rotation limiting portions protruded from one surface of the second member;
a support shaft disposed to pass through the first through hole and the second through hole; and
a third member formed in a plate-like shape and fixed to the support shaft,
wherein a rotation of the first member is limited by the rotation limiting portions and a rotation of the second member is limited by the second through hole.

2. The head mounted display of claim 1, wherein the rear band part comprises:
a rear band extending to have a predetermined length so as to be tightened on the rear of the user's head;
slide rails located to surround an outer surface of the rear band, and configured to move along the outer surface of the rear band when the hinge members slide; and
a rear band cover coupled to the rear band so that an inner surface thereof is located on outer sides of the slide rails.

3. The head mounted display of claim 2, wherein the rear band cover is provided on the inner surface thereof with a slide rail guide groove extending by a predetermined depth along a direction that the rear band cover extends, and
wherein the slide rails slide with being supported by the slide rail guide groove.

4. The head mounted display of claim 3, wherein the rear band part is provided with a support bracket inserted into the rear band cover to support the slide rails located in the slide rail guide groove.

5. The head mounted display of claim 2, wherein the hinge members comprise a first hinge member supporting one end portion of the body and a second hinge member supporting another end portion of the body, and
wherein the slide rails comprise a first slide rail coupled to the first hinge member, and a second slide rail coupled to the second hinge member and extending toward the first slide rail.

6. The head mounted display of claim 5, wherein the first slide rail is provided with a first gear portion formed downward on one end portion thereof,
wherein the second slide rail is provided with a second gear portion formed upward on one end portion thereof to face the first gear portion, and
wherein the first gear portion and the second gear portion are brought into contact with a rotation gear to allow relative movement of the first and second slide rails.

7. The head mounted display of claim 6, wherein the first gear portion and the second gear portion rotate with being engaged with the rotation gear, in response to the forward and backward sliding of the hinge members, so that the first slide rail and the second slide rail move forward and backward along the slide rail guide groove.

8. The head mounted display of claim 6, wherein the rear band cover is provided with a rotation gear accommodation protrusion protruding toward the rear band so that the rotation gear is inserted therein.

9. The head mounted display of claim 8, wherein a rotation limiting member is inserted into the rotation gear accommodation protrusion to limit the rotation of the rotation gear.

10. The head mounted display of claim 1, wherein the wearable member further comprises:
   a base portion coupled to the front band part and having a shape corresponding to the front of the user's head; and
   a cushion portion coupled to the base portion and configured to absorb shock.

11. The head mounted display of claim 1, wherein the front band part comprises front band rails disposed on both ends thereof,
   wherein the front band part comprises a front band adjustment portion configured to move the front band rails to be tightened on the user's head, and
   wherein the front band adjustment portion implements the movement of the front band rails by applying a predetermined tensile force to the front band rails while supporting the front band rails.

12. The head mounted display of claim 11, wherein the front band adjustment portion comprises a dial member supporting the respective front band rails, and
   wherein the dial member comprises:
   a holder formed in a cylindrical shape having an opening at one end thereof, and provided with an insertion hole formed through a central portion thereof so that a guide pin is inserted, and a gear support groove formed along an inner circumferential surface thereof;
   a main dial disposed to cover the opening and configured to be rotated by a user in one direction;
   a first gear coupled to the guide pin, engaged with the gear support groove, and configured to rotate while an outer surface thereof is brought into contact with the gear support groove when the main dial is rotated; and
   a second gear fixed to one end of the guide pin, allowing the movement of the front band rails in response to the rotation of the first gear, and configured to apply the predetermined tensile force to the front band rails.

13. The head mounted display of claim 12, wherein the gear support groove is provided with a thread formed in one direction to allow the rotation of the first gear only in the one direction.

14. The head mounted display of claim 13, wherein the front band rails, when the main dial is rotated by a preset angle, move to right and left by a distance corresponding to the rotation.

15. The head mounted display of claim 12, wherein the first gear is separated from the gear support groove when the main dial is pushed, so that the tensile force applied to the front band rails by the second gear is removed.

16. The head mounted display of claim 1,
   wherein a sliding distance of a support portion of the first member is limited by the rotation limiting portions, and
   wherein an angle at which the first member is rotatable centering on the support shaft is limited in an upward or downward direction.

* * * * *